No. 811,954. PATENTED FEB. 6, 1906.
J. F. RICHARDSON.
METHOD OF BRAZING STEEL AND COPPER.
APPLICATION FILED OCT. 27, 1904.
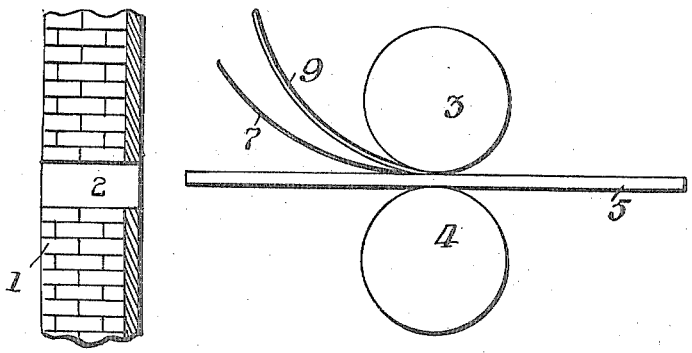
Fig. 1.
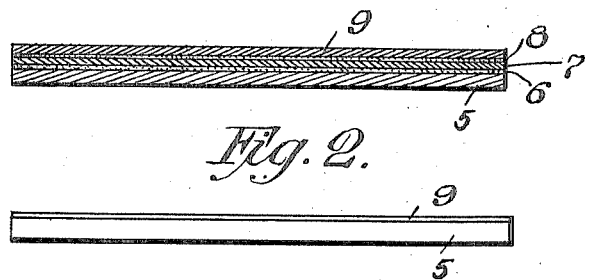
Fig. 2.
Fig. 3.
Witnesses:
H. H. Butler
E. E. Potter
Inventor
J. F. Richardson
By A. C. Evert & Co.
Attorneys

UNITED STATES PATENT OFFICE.

JOHN F. RICHARDSON, OF PITTSBURG, PENNSYLVANIA.

METHOD OF BRAZING STEEL AND COPPER.

No. 811,954.

Specification of Letters Patent.

Patented Feb. 6, 1906.

Application filed October 27, 1904. Serial No. 230,256.

*To all whom it may concern:*

Be it known that I, JOHN F. RICHARDSON, a citizen of the United States of America, residing at Pittsburg, in the county of Allegheny and State of Pennsylvania, have invented certain new and useful Improvements in Methods of Brazing Steel and Copper, of which the following is a specification, reference being had therein to the accompanying drawings.

This invention relates to certain new and useful improvements in methods of brazing steel and copper; and the invention has for its object the provision of novel means whereby a sheet of copper may be effectually brazed upon a sheet of steel or iron.

With the above object in view reference will be had to the accompanying drawings, forming a part of this application, wherein like numerals of reference indicate like parts throughout the several views, in which—

Figure 1 is a diagrammatical view illustrating my improved method of brazing copper and steel. Fig. 2 is a longitudinal sectional view upon an enlarged scale, showing the manner in which the copper is brazed upon the steel; and Fig. 3 is a side elevation of the finished article.

To put my invention into practice, I employ a furnace the front wall of which is shown in Fig. 1 of the drawings, and I also employ in connection with this furnace a set of two-high rolls or any other suitable means whereby a plurality of pieces of material may be compressed together sufficiently to force the molecules of one piece into contact with the molecules of the other.

In carrying my invention into effect the reference-numeral 1 indicates the front wall of a furnace having formed therein a door 2, and reference-numerals 3 and 4 indicate two rolls which I employ for compressing the material to be brazed together.

The reference-numeral 5 indicates a piece of steel upon which the copper is to be brazed, and this piece of steel is heated to a white heat in the furnace, at which time it is withdrawn, and prior to feeding the same through the rolls at a white heat I spread on the upper surface thereof a suitable flux 6, such as borax, and then a layer of very thin sheet-brass 7 is employed, and upon this another layer of flux 8, such as borax, is spread, and then the copper plate 9 to be brazed upon the steel is placed in position, and the steel plate 5, brass sheet 7, and copper plate 9 are forced through the rolls 3 and 4, these rolls compressing the three pieces together; and the high heat of the steel fuses the brass and the flux used, and a perfect weld is formed between the copper plate 9 and the steel plate 5, presenting an appearance as shown in Fig. 3, the sheet of brass which was used being invisible, owing to the same being a very thin sheet and becoming fused when placed in contact with the white-heated steel plate 5.

What I claim is—

1. A method of brazing steel and copper, consisting of heating a piece of steel to a white heat, then spreading a flux over the surface of the steel, then laying a thin sheet of brass substantially coextensive with the steel thereon and again spreading a suitable flux upon the surface of the brass and then laying the piece of copper which is to be welded to the steel upon the flux and brass, and then submitting the same to suitable rolls or a compressor whereby the three sheets of material are compressed, substantially as described.

2. A method of brazing steel and copper, consisting of heating a piece of steel to a white heat and spreading a flux upon its one surface, then applying a thin sheet of brass of an area equal to that of said surface to this surface and again spreading a flux upon the brass, and then placing a piece of copper to be brazed to the steel upon the sheet of brass and flux and submitting the same to a compressing means whereby they are forced into engagement with each other under pressure.

3. The method of forming a composite sheet of steel and copper consisting in heating a sheet of steel, applying a flux to said sheet while the sheet is in heated condition, then laying a sheet of brass upon the sheet of steel, then laying a sheet of copper upon said sheet of brass and melting the sheet of brass by the initial heat of said sheet of steel, and then while the brass is in melted condition compressing the composite sheet.

4. The method of brazing steel and copper consisting of heating the steel, placing a flux upon said steel, then placing brass upon said steel, and lastly placing a sheet of copper upon said brass, and then welding said metals together by pressure while the steel retains a part of its initial heat.

In testimony whereof I affix my signature in the presence of two witnesses.

JOHN F. RICHARDSON.

Witnesses:
  POTTER,
  LAWSON.